C. WINTER.
APPARATUS FOR ISSUING TICKETS AND REGISTERING RECEIPTS.
APPLICATION FILED JUNE 20, 1914.

1,256,412.

Patented Feb. 12, 1918.
5 SHEETS—SHEET 1.

Witnesses:
B. W. Dommers
E. Leckert

Inventor
Charles Winter.
By Henry M. ____ atty.

C. WINTER.
APPARATUS FOR ISSUING TICKETS AND REGISTERING RECEIPTS.
APPLICATION FILED JUNE 20, 1914.

Patented Feb. 12, 1918.
5 SHEETS—SHEET 3.

Witnesses:
B. Sommers
E. Leckert

Inventor
Charles Winter,
By Henry Orth Jr.
Atty

C. WINTER.
APPARATUS FOR ISSUING TICKETS AND REGISTERING RECEIPTS.
APPLICATION FILED JUNE 20, 1914.

1,256,412.

Patented Feb. 12, 1918.
5 SHEETS—SHEET 4.

Witnesses:
P. Dommers
E. Leckert

Inventor
Charles Winter,
By
Atty.

UNITED STATES PATENT OFFICE.

CHARLES WINTER, OF LONDON, ENGLAND.

APPARATUS FOR ISSUING TICKETS AND REGISTERING RECEIPTS.

1,256,412.      Specification of Letters Patent.      Patented Feb. 12, 1918.

Application filed June 20, 1914. Serial No. 846,330.

*To all whom it may concern:*

Be it known that I, CHARLES WINTER, a subject of the King of Great Britain, and resident of "Welton," 145 Olive road, Cricklewood, London, England, have invented new and useful Improvements in and Relating to Apparatus for Issuing Tickets and Registering Receipts, of which the following is a specification.

This invention comprises improvements in and relating to apparatus for issuing tickets and registering receipts and is principally concerned with an apparatus adapted for use on public conveyances, or in public buildings, places of entertainment, and other places where different fares or admission fees are charged and received and tickets of corresponding values are issued, the tickets being printed in the apparatus and issued and the values registered by a simple manual operation.

The chief object of the invention is to provide a machine which is small and compact so that it is capable of being carried upon the person without inconvenience, which is extremely simple and capable of resisting the wear and tear of ordinary every day use by unskilled persons, and which may embody various devices having for their objects the totalizing of the amount of money received corresponding to the face value of tickets issued, the recording of the consecutive and total number of tickets, and the recording of the number and value of tickets issued between various stages or times, thus preventing fraud upon the part of the conductor or attendant. In connection with tickets for passengers on public vehicles, the invention seeks to provide automatic checking means which are at least as adequate and comprehensive as checking systems now in vogue comprising the use of a registering punch and a chart which is filled in at various stages of the journey by the conductor with particulars of the numbers of tickets issued from different packs of consecutively numbered tickets.

In the apparatus with wh'ch this invention is particularly concerned the tickets, are printed by a sliding platen provided with permanent printing characters and with series of movable printing surfaces so mounted that any surface in any series can be readily selected and brought into the same plane as the permanent characters on the platen. The permanent printing surface on the platen may be composed of the name of the company to whom the receipts are due, the designation of the vehicle, the distinguishing character, number, or mark for the particular vehicle on which the apparatus is used, or any other matter required to be printed on all the tickets. Words and figures indicating the starting point, the destination, the face value, the consecutive number, and like particulars are movable as herein after described. The date, the day of the week, indications of the time of day whether before or after noon and like particulars which are only varied at comparatively long intervals, may be borne by printing surfaces or plates adapted to be inserted and secured in suitable recesses in the platen. In the case of an apparatus for use on conveyances, one of the aforesaid movable series of printing surfaces would comprise the names of the various starting points along the journey, another if required would comprise the names of the various destinations and a third would comprise a number of fares ranging from the minimum fare for short stages to the maximum fare charged on the vehicle. The printing device is capable of being depressed on to an impression plate over which a strip is guided, and this strip is automatically fed by the amount of one ticket-length during the ascent of the printing device and if desired may be automatically cut off, or be marked, perforated or scored upon a line along which it is intended it should be torn off.

In some previous arrangements of apparatus it has been proposed to employ a cam in connection with wheels carrying the type characters for printing the different amounts charged for the various fares, and this cam was set in accordance with the particular type brought into printing position so that when the printing operation took place a particular point on the periphery of the cam was brought into engagement with the operating arm of a totalizer and the latter was operated to an extent corresponding with the amount of the fare printed on the ticket. This mode of operation was an improvement upon arrangements according to which each separate fare value had a, corresponding totalizer, and the present invention is primarily concerned with the provision of a simple mechanism whereby various fare values may be totalized on one and the same totalizer and, if necessary, recorded.

According to this invention a slider is variably operated by the fares-printing element which preferably consists of a revoluble disk carrier having the type characters mounted upon its periphery. The disk is provided with a number of abutments or striking devices corresponding with the number of fare values. During any operation of the apparatus one of these striking devices corresponding to the fare value being printed operates the slider to an extent corresponding to the fare value, and therefore the totalizer which is operated by the slider is operated to an extent corresponding with the amount of the fare printed upon the ticket. The arrangement of the striking devices may be likened to the cam formation heretofore employed, and indeed a cam device may be used in place of a number of strikers.

The printing combination may comprise a printing counter which is advanced by unity each time that the printing device is operated and this counter while numbering each ticket with a consecutive number will afford an additional check as to the total number of tickets issued.

Inasmuch as the slider aforesaid is reciprocated over various distances corresponding with the different fares to be recorded, this slider may be utilized according to these improvements for the production of a graphic record of the receipts during all stages of the journey. For example a paper strip may be fed by a slight amount each time that the printing device is operated and the slider may be fitted with a recording pencil or marker which would make transverse marks upon the strip the height of which marks would depend upon the distance over which the slider is moved by the cam device. Therefore fares of different values would be recorded by marks of different heights. It might be arranged moreover to feed the paper strip a certain distance each time a fresh stage is reached and the name of the starting point is changed. In this way a blank space would occur at intervals between the transverse lines produced by the marking device so that it could be seen at a glance how many tickets of any particular value were issued during any particular stage.

In order to enable the invention to be readily understood reference is made to the accompanying drawings in which:—

Fig. 2ª is a representation of a ticket such as may be printed in the apparatus shown in Figs. 1 and 2.

Fig. 11ª is a detail view of the escapement seen in Fig. 11 to a larger scale.

Referring to Figs. 1 to 7 the base plate $a$, is adapted to be suspended upon the front of the attendant. At the lower end there is a housing $b$ fitted or formed on the plate $a$ for the reception of a roll $c$ of paper strip which may be of a width about equal to that of the usual tram or omnibus ticket and is wound upon a suitable spool $d$. A spring operated arm $e$ Fig. 2 may be mounted in the housing and may be adapted to press upon the periphery of the roll $c$ with sufficient strength for preventing the roll from unwinding itself. At the top, the housing is closed in by a plate $f$ rigidly formed or fixed upon the base plate $a$ and the upper surface of this plate serves as the impression surface. The housing $b$ may be closed by a door or cover $g$ easily removable for the purpose of inserting a fresh roll of paper.

A guide device or devices $h$ may be fixed along the impression plate $f$ for engaging the edges of the strip in order to keep the latter flat and even upon the impression plate. Two rollers $j$ $k$ are mounted at that end of the impression plate $f$ where the paper is made to enter the guides $h$ and are in such close relationship that the strip, being introduced to the nip of these rollers, is fed along the impression plate $f$ when one or both of these rollers $j$ $k$ is or are driven.

The strip feed roller $k$ is conveniently driven by a rack $l$ on the sliding frame $m$ carrying the printing combination, the said rack $l$ gearing with a toothed wheel $n$ which drives the roller $k$ through a ratchet or free wheel $o$ shown in dotted lines. If desired both rollers may be driven. The frame $m$ carries at its lower end a printing plate or platen $m'$ adapted to print the invariable matter on the tickets.

At convenient positions the base plate $a$ is formed or provided with vertical guides $p$ for the reception of the sliding frame $m$ which carries the printing combination, said frame being provided with a handle M for moving it in the guides. The guides may consist of suitably shaped grooves formed in the base plate, or of guide members rigidly formed on or fixed thereto. The sliding frame may be formed with beveled or inclined or other suitable edges or parts to fit the grooves.

Figure 7:
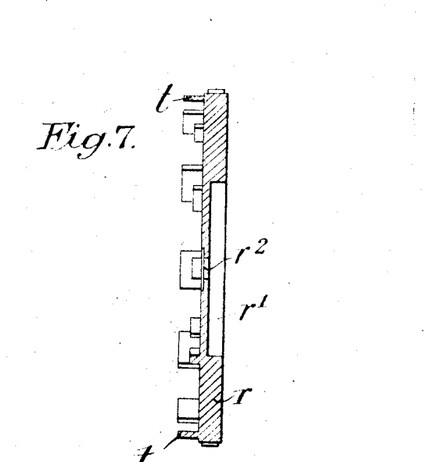
Fig. 7 is a central vertical section of Fig. 6.

A horizontal pivot $q$ preferably of relatively large diameter, is formed or rigidly mounted on the sliding frame $m$ and a revoluble disk or wheel $r$ is mounted on the pivot, the disk or wheel carrying on its periphery, the types for printing the various fare values or fare values and description of tickets. In Fig. 7 the disk $r$ is shown centrally recessed at $r'$ to receive the pivotal projection $q$ on the framing a central bolt hole $r^2$ enabling the disk $r$ to be secured. The types are preferably formed on the tips or end surfaces of projections or arms $s$ radiating from the disk or wheel. The disk or wheel may be formed for example with twelve arms or projections $s$ bearing upon their end surfaces the types for printing fares from one half-penny up to sixpence. Thus the type for "½" and "6d" may be on neighboring arms $s$ and each of the types on all other arms will differ from either of its neighbors by the value of one halfpenny. As the operator will usually look down upon an arm $s$ which is situated diametrically opposite the one which is to be used for printing, the various arms $s$ may have projections $t$ bearing indications of the fare values which the types at the opposite side of the disk are adapted to print. The setting of this disk $r$ is readily accomplished by the operator turning the disk until the indication of the fare value required appears upon a projection $t$ at the top, or in any other convenient place, whereupon the operator is aware that the required type is in alinement or printing position. Obviously the disk may be operated by the application of a finger to the projections or arms $s$.

In order to positively maintain the selected type in the correct position during the sliding movement of the frame $m$ required for performing the printing, the projections $t$ or other suitable projections may be adapted to coöperate with a vertical central guide groove $u$ on the base plate $a$. When the disk $r$ is set for printing the proper fare, the uppermost one of these projections $t$ lies opposite the upper end of the central guide groove $u$ and, upon the depression of the printing device by the handle M, such projection enters the groove $u$ and maintains the selected type accurately in the position required for printing.

The fares totalizer is arranged in any convenient position on the base plate $a$ and comprises a barrel $v$ around which is wound a flexible steel band $w$ the free end of the band being connected to the slider $x$ which may have a dovetail portion movable in a correspondingly formed guide groove in the base plate $a$. This dovetail groove may be the central groove $u$ aforesaid or a smaller groove formed within it. The barrel $v$ may operate a totalizer or counter of any suitable kind through the medium of a ratchet $y$ and when the barrel $v$ is turned during the unwinding of the flexible band $w$, a spring may be wound for returning the barrel $v$ and slider $x$ to the initial position or the slider $x$ may be pulled upward by a suitably arranged spring in addition to the action of the spring which is operative upon the barrel of the totalizer. The slider $x$ is operated by what has been hereinbefore termed a cam device. The latter is advantageously formed as follows:—On the radius passing through the arm $s'$ which is opposite the arm $s^2$ bearing the "6d" type, a striking surface $z$ is formed in such a position that, when the disk is adjusted for printing "6d", the striking surface $z$ will be close to the top of a projection $x'$ on the slider $x$. Upon depressing the casing $m$ containing the printing combination therefore, the surface $z$ will immediately engage the slider $x$ and the stroke imparted to the slider may be almost equal to the travel of the casing $m$. The said stroke may be one and a half inches. The striking surface 1 on the radius passing through the arm opposite that bearing the "5½" type may be situated one-eighth of an inch farther from the center so that after moving the disk $r$ to bring this striking surface 1 into position and upon depressing the casing $m$ this surface 1 will move idly for one-eighth of an inch before striking the slider $x$ the travel of which in this case will only be one inch and three eighths. The striking surface of each lower value is arranged at one eighth of an inch farther from the center than the preceding one until the half-penny fare is reached, the striking surface 2 belonging to which is situated one inch and three eighths farther from the slider $x$ than that belonging to the sixpenny fare. Consequently, when "½" is to be printed, there is a lost motion of one inch and three eighths before the striking surface 2 engages the slider which will only be moved one eighth of an inch in the printing of "½". Supposing the barrel $v$ to be revolved one-half turn by the full stroke of one and a half inches of the slider, and assuming the barrel to operate in connection with a ratchet ring having twenty four teeth, then the ring will be turned twelve teeth for sixpence, eleven for fivepence halfpenny and so on and one tooth for a halfpenny, and these movements can be utilized for putting forward a totalizer by corresponding amounts. The totalizer may indicate the total number of half-pennies or may be of the type indicating pence, shillings and pounds. It may be observed from Fig. 6 that the striking surfaces $z$ to 2 arranged as aforesaid have the formation somewhat of a snail cam.

Obviously the striking surface $z$ for 6d may be farther from or nearer to the center of the fare disk—as may be found convenient for determining the operation of the totalizer aforesaid. If the fare five-pence halfpenny were not required, the "5½" type might be replaced by "T" or any other indication of "transfer" or other condition of issue and in that case the striking surface or cam for that particular type might be omitted so that the totalizer would not be operated when printing this special indication. One or more additional arms $s$ may be provided on the fares disk $r$ and any of the striking surfaces corresponding with such arms or projections may be omitted, should it be desired to issue a ticket without at the same time registering a payment.

The totalizer is preferably covered in by a casing which is secured in such a manner that access can be had to the interior of the casing only by an authorized official possessing a key adapted to unlock a door of the casing.

The series of printing surfaces for printing the starting places may be mounted upon a chain carrier, as may also be the series for printing the destinations, when it is required to print the latter.

Figure 1:
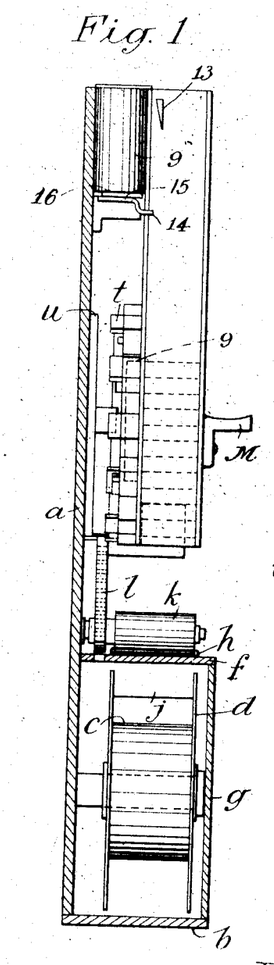
Figure 1 is a sectional side elevation, which is more or less diagrammatic, of a ticket printing and issuing apparatus embodying the present improvements.
Figure 2:
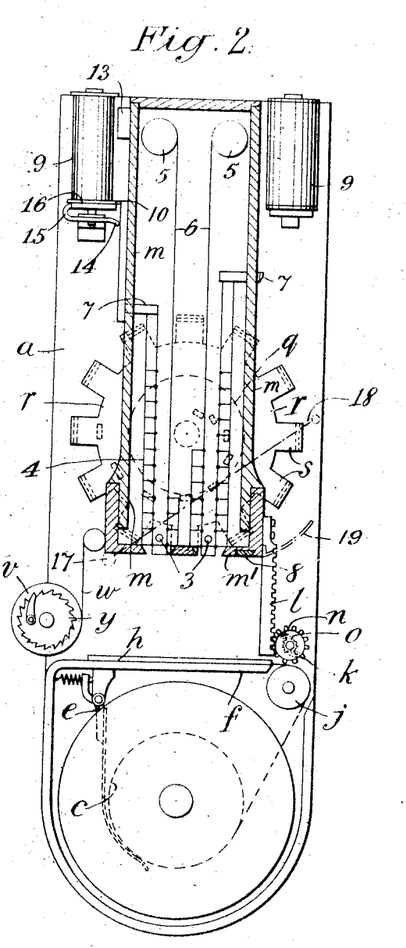
Fig. 2 is a front elevation partly in section of Fig. 1.
Figure 2A:
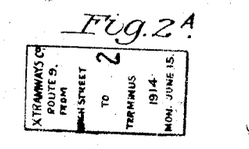
Figure 3:
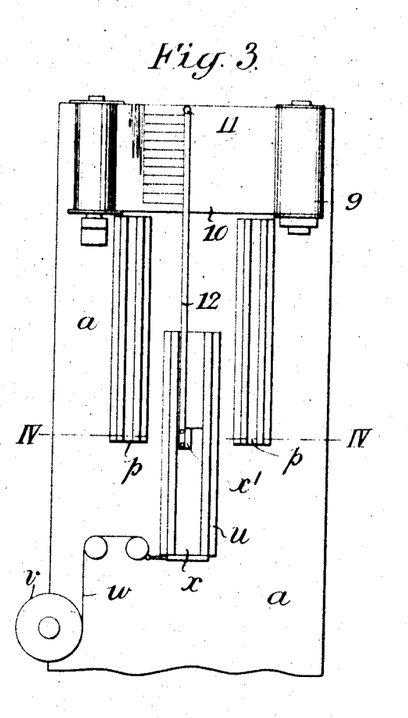
Fig. 3 is a front elevation of a portion of the base plate showing the graphic recorder and fares totalizer mounted thereon.
Figure 4:
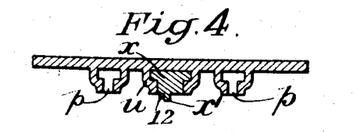
Fig. 4 is a transverse section on the line IV—IV of Fig. 3.
Figure 5:
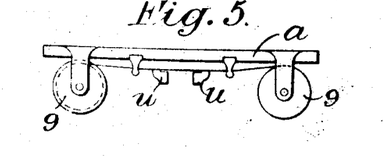
Fig. 5 is a plan of Fig. 3.
Figure 6:
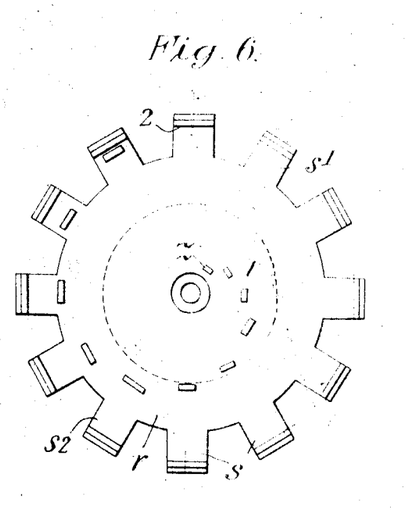
Fig. 6 is a rear elevation of the fares printing disk.

The arrangement illustrated in Fig. 2 comprises a four sided or polygonal roller 3 for each chain of printing surfaces or blocks 4 and the two rollers may be mounted close together at the bottom of the framing $m$ while the chains will extend upwardly along parallel lines. Four sided rollers are preferable as they enable any of the printing surfaces to be used without the least danger of the ticket being marked by a neighboring surface in the series. The size of the flats on the four sided or polygonal rollers 3 will be determined by the size of the movable printing surfaces which are to be brought one after another into line with the platen $m'$ and between the flat surfaces on the roller that is to say at each of the corners a groove may be provided into which the hinge portion of the printing blocks may be made to engage so that there shall be no slip and the blocks will always be seated evenly upon the flats of the roller. At the top of the frame $m$ are mounted two spring barrels 5 for winding on flexible tapes 6, the latter having one end fixed to a barrel 5 and the other end secured to one end of a length of chain composed of a number of blocks 4 hinged together and formed with suitable types on their surfaces. Each chain of blocks runs around one of the four-sided or polygonal rollers 3 and its free end is connected with a suitable operating device such as a pointer or slider 7 which is movable over any suitable rack arrangement on the frame $m$. If therefore the operating device 7 is moved up or down over the rack the chain is pulled against the action of the spring barrel 5 from which the tape 6 is unwound, or the barrel 5 is allowed to wind up the tape 6 and to pull on the chain of blocks. In this way any printing surface in the chain can be brought rapidly to the correct position in the platen $m'$.

The chains may be endless and may run around suitable pairs of rollers or pulleys mounted in the frame, the upper one of the pulleys of each pair being if desired of relatively large diameter so that the greater portion of the chain carrier is lapped around the same and the other or lower pulley or roller of each pair being of small diameter and mounted near the respective aperture in the platen $m'$ so as to support any selected printing surface correctly in such aperture.

The sliders or pointers 7 may work over a scale representing the various places recognized as starting places or destinations and when the pointers 7 are brought opposite any selected point on the scale the indications on the latter will show the printing surfaces which have been brought into printing position.

It is preferred to arrange these two chain carriers in the same plane side by side and in front of the disk or wheel $r$ carrying the types for printing the various fares. Thus the ticket produced may be headed with the name of the company and with particulars of the service or route and of the vehicle. Below the heading the starting point and if required the destination will be printed, the one under the other, with suitable words adjacent thereto such as "from" and "to" in permanent type and at the side the fare will be printed. At the foot of the ticket may be printed the day of the week, the date, and the consecutive number of the ticket and any other particulars or information. Any of these particulars which are required to be varied from time to time may be printed by interchangeable plates 8 which may be inserted into dovetail recesses as indicated in Fig. 2.

At the commencement of each journey and as each stage is reached, the operator shifts the series of starting point printing surfaces. If it is required to print the destinations then, unless several tickets for identical journeys are issued in succession, the operator must adjust the disk which prints the fares and also the series of destination printing surfaces to suit the particular journey which the passenger, to whom the ticket is issued, desires to make.

For the purpose of producing a graphic record of the receipts, vertical rollers 9 may be mounted at any convenient position on the base plate and a paper strip 10 running transversely of the base plate may be unwound from one roller on to another. A recording device such as a marking device or roller or recording pencil 11 Fig. 3, may be supported by an arm 12 extending from the slider $x$ which operates the totalizer $v$. Therefore, during each reciprocation of the slider $x$ a line will be produced upon the strip 10, across the latter, and the height of this line will correspond with the amount of the fare printed by the fares disk $r$. Each time that the frame $m$ is depressed for printing a ticket a ratchet feed may be operated for imparting a slight travel to the record strip, so that all fares received will be graphically recorded by the lines of different heights marked across the strip.

For example a suitably inclined surface 13 may be carried by the framing or casing $m$ and at each depression of the latter may be adapted to engage the tail 14 of a pawl 15 engaging the ratchet 16 which turns the roller or spool and imparts a step by step feed to the paper. Whenever a fresh stage is reached an additional feed may be given to the strip for causing blank intervals to be shown and the names of the stages may afterward be written on the blank interval on the record strip. In this way the number of tickets of any particular value which have been issued during any given stage can be at once ascertained by counting the number of lines of a particular length recorded between the marks or intervals corresponding with the commencement and termination of that stage. The record strip may be printed with parallel longitudinal lines by means of which the value represented by any transverse mark made by the recording pencil can be ascertained at a glance.

A suitable inking roller or rollers may be provided to wipe across the type during the descent of the frame, and pass to one side during the actual printing.

For example, an inking roller 17 may be supported upon a spring operated arm 18 and after passing across the platen $m'$ may come against a curved inking surface 19 which also will keep the inking roller out of the way of the arms or spokes of the fares disk during the printing movement.

In the modification seen in Figs. 8 to 11 the sliding frame is composed of plates 20 suitably held together by screws and distance pieces and the side edges of these plates work in or against suitable guides 21 during the descent and ascent of the frame. A bush or bearing 22 is secured in the plates 20 and the spindle 23 of the fares disk $r$ turns in this bearing a knob 24 being provided upon the outer end of the spindle 23 and having facets formed upon it, each of said facets bearing an indication of a corresponding type of the fares disk. The arrangement is such that when a facet bearing say the minimum fare is uppermost the operator knows that the type for printing that fare is in printing position.

The disk $r$ is not shown formed with spokes or arms in this instance but has slightly projecting printing surfaces $s$. Also the guide parts $t$ in this construction do not enter the guide groove as in the construction first described but, as will be seen by reference to Fig. 10, the guide pieces $t$ operate in pairs and when the disk $r$ descends a guide piece $t$ moves down in contact with the outer edge of a respective guide strip $u$ on the rear wall of the casing.

Upon the exterior of the bush 22 is mounted a sector 25 which can be swung by means of an arm 26 fitted with a finger piece 27. This sector 25 is provided with several printing surfaces bearing such indications as "S" for single "R" for return, "T" for transfer and "W" for workman and the desired printing surface is brought into position by adjusting the said sector by the finger piece 27.

Figure 8:
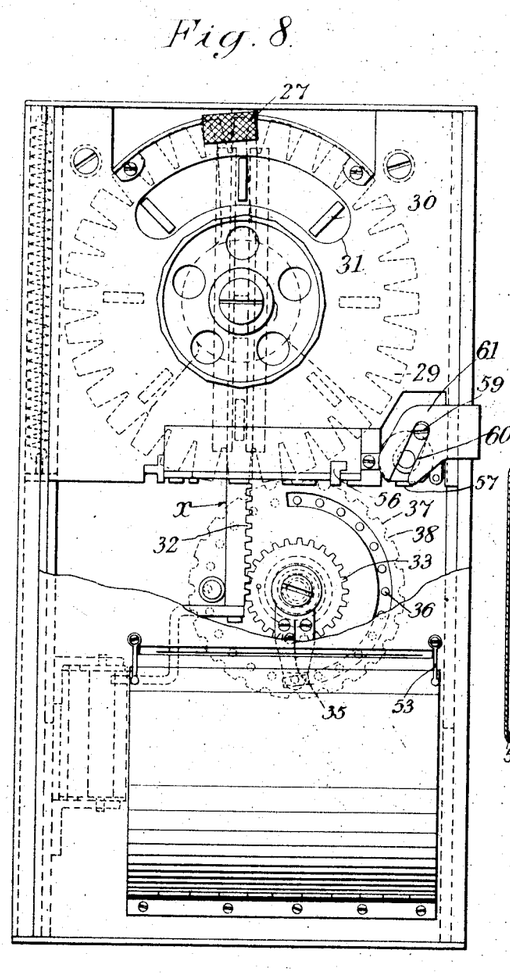
Fig. 8 is a front elevation of a modified construction having a part of the front cover broken away.

A disk 28 is also revolubly mounted upon the exterior of the bush 22 and may be formed with any desired number of arms 29, see Fig. 8, upon the end of each of which is a type or printing surface adapted to print a character or description corresponding with a particular stage. For example consecutive arms 29 may be adapted to print consecutive numbers, each stage being known or designated by a particular number. The disk 28 may be revolved by providing it with spaced finger pieces 30 which are accessible through an opening 31 in the front plate 20. Any suitable means may be employed for enabling the sector 25 and disk 28 to be moved only one step at a time and for insuring the correct positioning of the desired printing surface. The disk 28 is moved round one step as each stage of the journey or route is reached.

In this modification the slider $x$ is extended upwardly and downwardly being formed along the lower portion of one of its edges with teeth 32 which mesh with the teeth of a wheel 33. An arm 34 is fixed to this wheel and carries a pawl 35 which engages teeth or projections 36 upon a disk 37. The wheel 33 is turned by the descent of the slider $x$ and rack 32 against the action of a spring the slider being stopped in its ascent by striking against the top of the casing. The periphery of the disk 37 is formed with a number of notches 38 corresponding with the number of the teeth or projections 36 and a suitable click 39 engages with the notches 38 in succession. The rear surface of the disk 37 is suitably marked with numerals indicating different amounts from 0 up to the value of a particular coin. For example the disk may have marked upon it amounts successively increasing by one half penny from zero up to elevenpence halfpenny which means that there will be twenty four markings on the disk. When the disk has performed one revolution a pin 40 thereon, strikes an arm or point of a star wheel 41, another arm or point of which is meshing with pins or teeth 42 upon a concentric disk 43 of smaller diameter which is also formed with peripheral notches engaged by a click 44. This disk may be marked with shillings, successive numerals around the disk increasing by one from zero to nineteen, so that there would be twenty indications upon this disk 43. A pin 45 on the disk 43 engages at the completion of every revolution a point or arm of a star wheel 46 meshing with pins or teeth on a third concentric disk 47 which has peripheral notches engaged by a click 48 and the number of teeth upon which may be suitably chosen to give an indication of any desired maximum amount. This disk may be marked for example with numbers of pounds sterling each successive number increasing by one from zero up to the maximum chosen. It will be obvious that this indicator can be readily adapted for indicating amounts in other systems of coinage, as for example cents and dollars, by suitably designing the diameters, number of teeth or projections and so on. This totalizer is covered by a casing 49 secured on the back of the base plate $a$ and a suitable slot or sight opening is formed in the cover 49 through which are seen numerals in alinement on the three disks which numerals indicate the total amount recorded by the totalizer. It will be observed that the two star wheels 41 and 46 are mounted upon pivots fixed in a bracket 50 secured to the rear of the base plate $a$.

Figure 9:
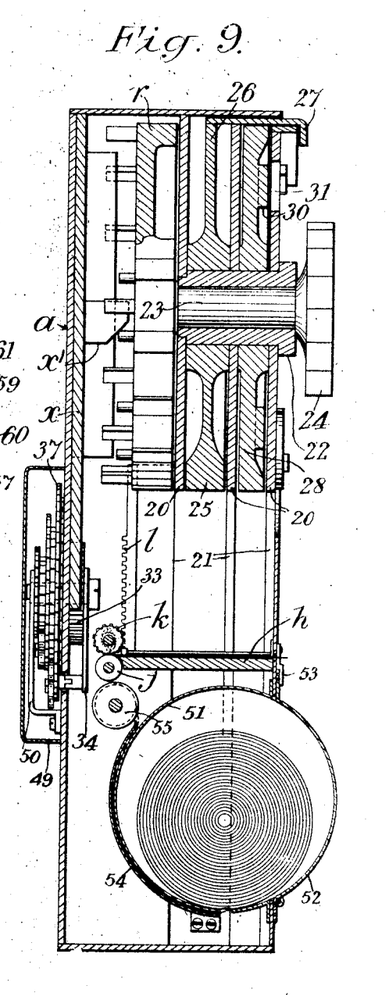
Fig. 9 is a central vertical section of Fig. 8.
Figures 10, 11, 11A:
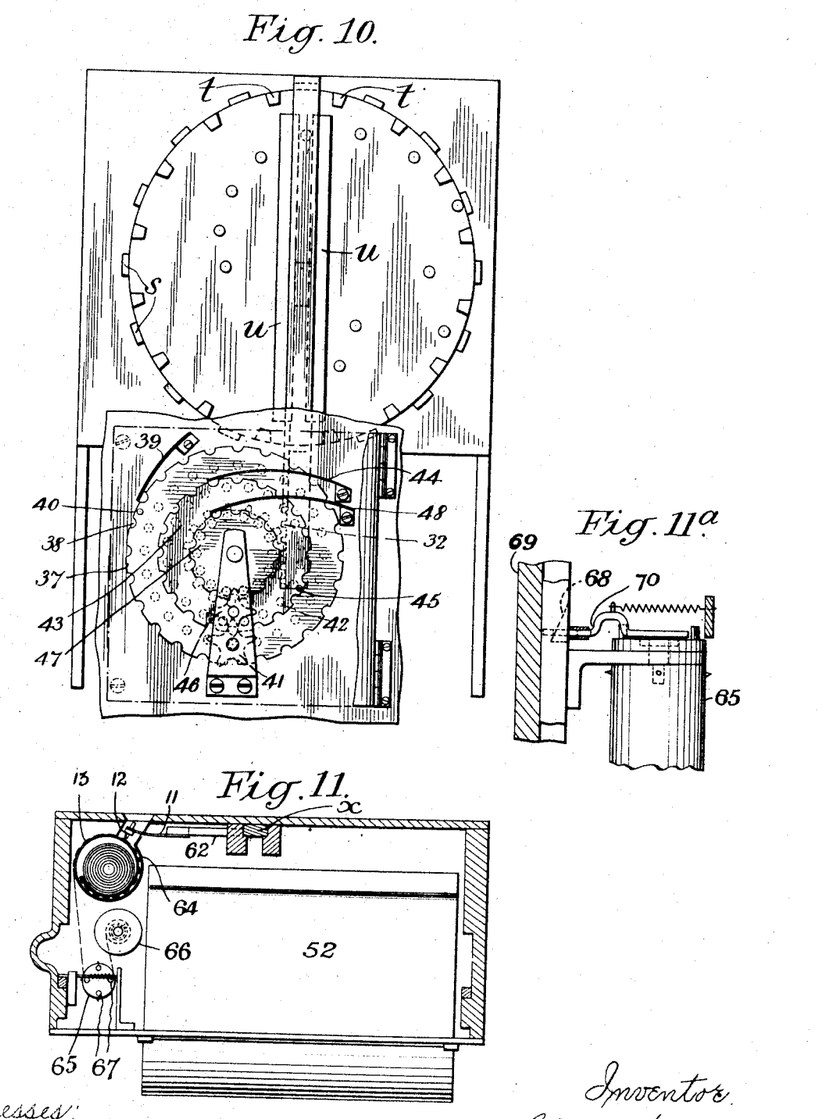
Fig. 10 is a rear elevation of certain of the parts.
Fig. 11 is a transverse section on the line XI—XI of Fig. 8.

In this modification the paper is fed out at the front of the apparatus the paper roll having its axis lying in a plane parallel with the plane of the base plate $a$. The roll may be loosely contained in a housing 51 fitted with a flap or door 52 secured by suitable fastenings 53. The paper is led out through a slot in the bottom of the housing and is passed through a guide formed by securing a curved plate 54 in close proximity to the exterior of the rear part of the housing, the plate 54 being concentric with the housing. The plate 54 puts a certain amount of drag or tension upon the paper when the latter is fed by the rollers $j$ $k$ the roller $k$ being driven in one direction only by a rack $l$ and ratchet device as in the construction first described. As seen in Fig. 9 the paper is drawn over an idle roller 55 and is fed from rear to front over the impression table.

In Fig. 8, 56 is a slot for receiving a similarly formed type bar which is inserted into the slot 56 and is adapted to print the date. 57 is a numbering printer of suitable known type operated step-by-step by an oscillating arm 58 having a pin 59 which engages an inclined slot 60 formed in a bracket 61 on the casing of the apparatus. When the printing combination descends, the pin 59 is moved toward the left hand and through the arm advances the indication of the numbering device by unity. Upon the ascent of the printing combination the pin 59 again enters the slot 60 and is moved to the right hand for resetting the arm 58 which is then ready for a further operation.

It will be observed from Fig. 8 that in this construction the type matter is arranged toward one side of the apparatus and consequently the paper roll and impression table being situated over toward that side a convenient space is afforded for housing the graphic recorder. Consequently a laterally extending arm 62 is secured to the slider $x$ and carries the blade 12 which is fitted with a marking pencil or device 11 as in the first described construction. The record strip roll is contained in a slit vertical cylinder 63 which has overlapping ends the overlapping portion 64 providing a tensioning guide for the paper which is led out of and around the cylinder past a feed controlling roller 65 to a spring winding roller 66. The roller 65 may be provided with prickers for positively engaging the paper in order to prevent slip. The roller 65 may be provided upon the top with escapement teeth pins or devices 67 and each time that the printing combination descends a projection 68 on the extension 69 of the framing, operates the escapement 70 and permits the roller 65 to be turned one step by the paper under the pull of the spring roller 66. An opening 71 is formed in the base plate $a$ through which the operator may insert the point of a pencil or marker at the commencement of every stage in order that the numbers of tickets sold between the different stages may be easily deduced. It may, further, be desirable to record separately the number and values of ordinary tickets transfer tickets and return tickets. In order to enable this to be done there may be three sliders $x$, $x'$, $x^2$ Figs. 12 to 14 arranged close together in parallel grooves or guides and the pins or projections $z$, 1, 1ª, 2 and so on may be arranged so that they will engage one or another of these sliders according to whether the single or transfer or return fare is to be recorded. For example the pin $z$ is shown in position for engaging the right hand slider $x^2$ at the moment that an ordinary single fare arm $s$ is in printing position. By turning the disk $r$ in the clockwise direction the next spoke on the right will be brought into printing position and the corresponding pin 1 will be brought over the central slide $x'$, and this spoke may print a transfer fare. For example the printing surface on this spoke may be adapted to print the amount of the fare together with the letter T indicating transfer. In this way the values of transfer tickets may be recorded by the central slider. By turning the disk $r$ one step again in the clockwise direction the spoke next to the one last mentioned will be brought into printing position and the pin 1ª corresponding thereto will be moved over the left hand slider $x$ and this spoke may print a return ticket as for example by adapting the printing surface on this spoke for the printing of the letter "R" in conjunction with the amount of the fare so that the values of return tickets will be recorded by the left hand slider $x$. Each of the sliders $x$ $x'$ $x^2$ may operate a pencil of a different color so that the marks on the graphic record may be easily distinguished in the act of analyzing the record and summing up the different receipts. Also each of these sliders may operate a respective totalizer so that the three totalizers will show the total amounts received in respect of single ordinary, transfer and return tickets.

If desired there may be two or three projections corresponding with each of certain spokes and these may be adapted to simultaneously depress two or three of the sliders $x$ $x'$ $x^2$ for registering or recording other special fares and by the use of three slides obviously seven variations or classes of tickets may be recorded on the graphic record. For example, suppose that the three sliders operate respectively red, blue and green recording pencils, then for an ordinary twopenny single fare only the slider which operates the red pencil may be engaged by a projection on the fares disk, whereas for a return twopenny fare two projections may be brought over and into engagement with two sliders which operate respectively say the red and the blue pencils. The twopenny return fare would therefore be represented by parallel red and blue lines of the same length as the single red line representing the twopenny single fare.

Figures 12, 13, 14:
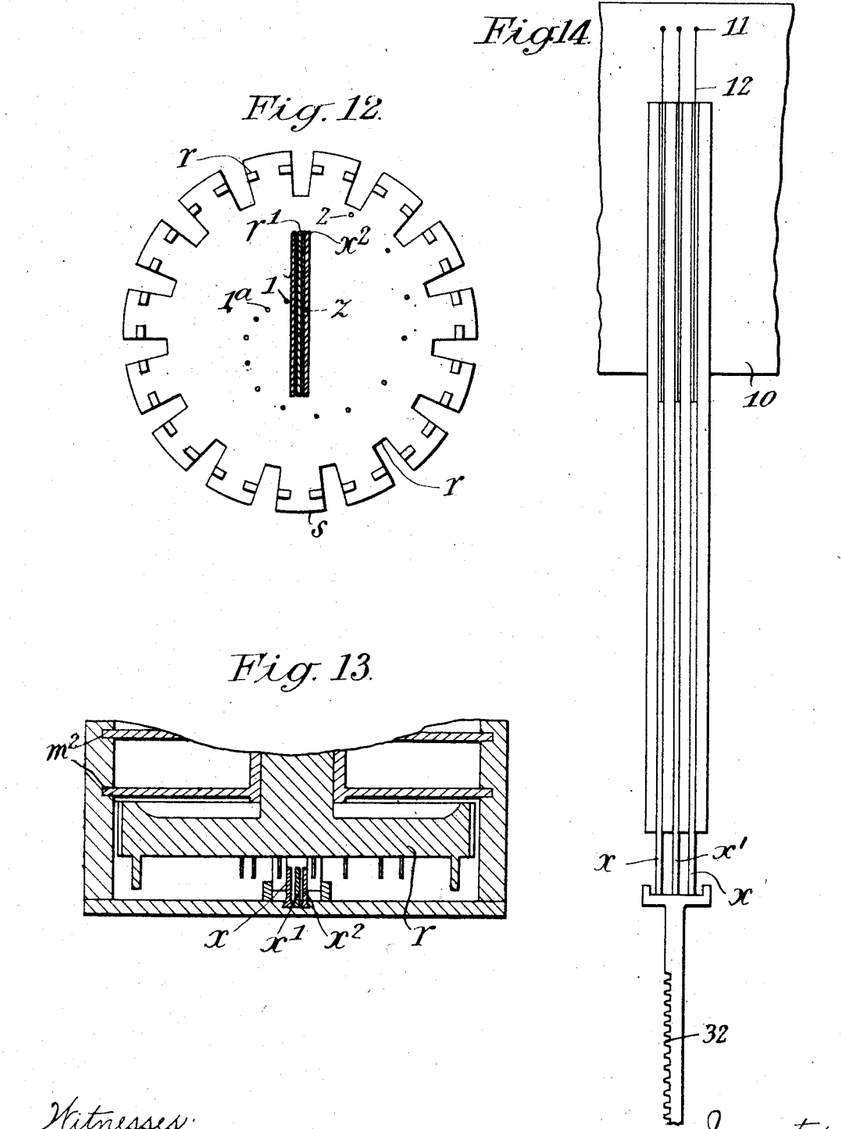
Fig. 12 is a view showing a modified construction of fares printing disk and arrangement of sliders operated thereby and Fig. 13 is a transverse section of an apparatus fitted with the modified printing disk and sliders shown in Fig. 12.
Fig. 14 is a front elevation showing the sliders in Fig. 13 and their operative connection with the totalizer.

Instead of employing several totalizers only one totalizer need be employed and the three sliders as seen in Fig. 14 may be arranged to depress a single rack so that the totalizer may be operated to the same extent for the same amount of fare by any one of the sliders independently of the others, or by two of them together or by all three simultaneously.

The tickets after being fed through the delivery opening may be torn off and to enable this to be accomplished with more or less accuracy a fixed blade, or line of spikes or points may be employed against which the ticket is torn. Or a guillotine or shearing knife may be arranged to be moved by the framing just at the end of its rising movement, or by hand, for the purpose of cutting off the ticket from the strip.

In order to distinguish special tickets issued, as for example workmen's tickets which are generally issued in the early morning up to a certain hour, printing and impression rollers may be introduced into the apparatus near the feed rollers and may be arranged to produce for example two colored lines along the tickets. Such rollers may for example be readily placed upon or removed from two fixed axles one on each side of the paper strip as will be readily understood.

In order to improve the neatness and clearness of the graphic record it may be arranged for the recording pencil or marker to be moved away from the record strip at the end of a recording movement and for the feed of the strip to take place at this moment. Consequently, as the strip is moved only when the pencil is lifted from it, the said strip will travel easily and the record marks will be clear and distinct as they will consist of separate vertical lines. The pencil or marking device may for example be caused to mount a suitable incline toward the end of its return stroke for the purpose aforesaid.

I claim:—

1. Ticket printing and issuing apparatus comprising in combination a base, a reciprocatory frame thereon, a series of fares printing surfaces, an adjustable support therefor mounted in said frame and adapted to be adjusted to bring any member of said series into printing position, an impression plate fixed on said base, a slider movable in guideways, on said base, a plurality of strikers variably arranged on said support and corresponding with respective printing surfaces, said strikers being adapted to engage said slider when moved into the path thereof and during printing movement of said frame, and a fares totalizer operatively connected with said slider.

2. Ticket printing and issuing apparatus comprising in combination a base, a reciprocatory form-carrying frame thereon, a disk revolubly mounted in said frame, a series of fares printing surfaces around the periphery of said disk projections arranged upon one face of said disk at different distances from the center thereof each of said projections appertaining to a respective printing surface on said disk, an impression plate fixed on said base, a slider movable in guideways on said base in the path of any projection belonging to a printing surface which has been turned to the printing position, and a fares totalizer operatively connected with said slider.

3. A ticket printing and issuing apparatus, comprising a reciprocatory printing device including an adjustable fares printing member, a plurality of actuating members operated by the movement of the latter, a slide movable into different positions by the actuating members during the printing movement of said device, and a totalizer positively actuated from the slide.

4. A ticket printing and issuing apparatus, comprising a reciprocatory printing device including an adjustable fares printing member, a plurality of actuating members carried by the latter, a slide arranged to be successively engaged by and movable into different positions by the actuating members during the printing movement of said device, and a totalizer connected with and variably actuated by the slide.

5. A ticket printing and issuing apparatus, comprising a reciprocatory printing device, a rotary printing device carried thereby, a reciprocable slide, a totalizer connected with and actuated by the movement of the slide, and a plurality of actuating members on the rotary printing device adapted to successively engage the slide during the printing stroke of the device and vary the stroke of the slide.

6. A ticket printing and issuing apparatus, comprising a printing mechanism including a fares printing element capable of selective adjustment, striking means variably disposed and movable with said element so as to participate in any selective adjustment, a slide in the path of any selected striking means and adapted to be operated thereby during the printing stroke of the printing element, and recording means connected with and operated by the movement of the slide.

7. Ticket printing and issuing apparatus comprising in combination a base, a reciprocatory form-carrying frame thereon, a series of fares printing surfaces, an adjustable support for said surfaces mounted in said frame, an impression table, a slider mounted in guides on said base, means on said adjustable support adapted to variably engage said slider in accordance with the variation of the fare printed, a totalizer operatively connected with said slider, a recording stylus connected with said slider, a record strip, feeding means for said strip and an operative connection between said frame and said feeding means substantially as set forth.

8. Ticket printing and issuing apparatus comprising in combination a base, a reciprocatory form-carrying frame thereon, a disk revolubly mounted in said frame, a series of fares-printing surfaces spaced around the periphery of said disk, projections spaced around said disk, a projection corresponding with a fare to be printed being adapted to engage a guideway on said base upon the depression of said frame with the desired printing surface in printing position, strikers spaced around said disk at varying distances from the center thereof, each of said strikers corresponding with a respective fare printing surface, a slider reciprocable on said base and in the path of any striker which is moved into position by the turning of said disk to bring the desired printing surface into printing position, and a fares register operatively connected with said slider, substantially as set forth.

9. A ticket issuing apparatus, comprising a base, a reciprocable frame thereon, a fares printing element adjustable to a selected position about a center on said frame, a plurality of locking members connected with said element and disposed to correspond with the disposition of fare values on said element, locking means on said base adapted to coöperate with said locking members when said frame is reciprocated, a slide on said base, variably disposed means in connection with said fares element adapted to operate said slide during the printing stroke of said element, and registering means connected with and operated by the movement of the slide.

10. Ticket printing and issuing apparatus comprising in combination a base, a reciprocable form-carrying frame thereon, a fares printing disk revoluble in said frame, means on said disk adapted upon the descent of said frame to engage guides on said base to prevent said disk from revolving during the printing operation, a fares register, a slider operatively connected therewith, strikers on said disk adapted to operate said slider to an extent proportional to the amount of the fare to be printed, an impression table, a paper feed adapted to feed a ticket strip over said table and an operative connection between said frame and said feed, substantially as set forth.

11. Ticket printing and issuing apparatus comprising in combination a base, guides thereon, a reciprocable form-carrying frame in said guides, a fares printing disk revoluble in said frame and in close proximity to said base, printing surfaces spaced around the periphery of said disk, projections spaced around the rear face of said disk, any printing surface having a corresponding projection which engages a guide on said base when said frame is depressed, strikers on the rear face of said disk each of said strikers being arranged diametrically opposite a corresponding printing surface and at such a distance from the center as bears the same proportion to another distance that the fares printed by the corresponding printing surfaces bear to one another, a slider reciprocable on said base in the line of travel of the axis of said disk and adapted to be engaged by one of said strikers, and a fares register operatively connected with said slider substantially as set forth.

12. A ticket issuing apparatus comprising a base, a reciprocable frame thereon, a selective fares dial on said frame, a plurality of strikers arranged on said dial at different radial distance from its center, each striker being respective to one of the fares on the dial, a slide mounted on said base so as to lie in the path of any selected striker and movable by the latter during the printing movement of the frame, and a recorder operatively connected with said slide.

13. A ticket printing and issuing apparatus, comprising a base, a reciprocable frame thereon, a dial revolubly mounted on said frame having type representing different fares values spaced around its periphery, strikers arranged on said dial at different radial distances from its center, the circular disposition of any striker corresponding with that of a respective type, guides on said base, a slide in said guides, the relative mounting of the dial and the slider being such that the act of selecting a particular type for printing brings a corresponding striker into the path of said slide, whereby the latter is operated during the printing movement of said frame, and a recorder connected with said slide.

14. Ticket printing and issuing apparatus comprising a reciprocable printing combination, including a rotatable fares printing element, striking devices variably arranged on said element as to their distances from the center and as to their positions relative to a given radius, a plurality of sliders adapted to be variably operated by said striking devices the arrangement of the latter constituting an automatic selective mechanism whereby one or other of said sliders is operated according to the denomination of the ticket issued, recording devices connected with respective sliders and registering mechanism operatively connected with said sliders.

15. Ticket printing and issuing apparatus comprising a reciprocable printing combination including a rotatable fares printing element, striking devices variably arranged on said element, a slider adapted to be operated by any one of said devices to an extent corresponding with the amount of the fare printed, a registering mechanism operatively connected with said slider, a recording stylus connected with said slider, a record strip adapted to be marked by said stylus, a step-by-step feed mechanism for said strip, and means carried by said printing combination operative upon said feed mechanism, substantially as set forth.

CHARLES WINTER.

Witnesses:
P. PHILLIPS,
H. D. JAMESON.

Copies of this patent may be obtained for five cents each, by addressing the "Commissioner of Patents, Washington, D. C."